(12) United States Patent
Ng-Thow-Hing et al.

(10) Patent No.: US 9,588,340 B2
(45) Date of Patent: Mar. 7, 2017

(54) PEDESTRIAN INTERSECTION ALERT SYSTEM AND METHOD THEREOF

(71) Applicant: Honda Motor Co., Ltd., Tokyo (JP)

(72) Inventors: Victor Ng-Thow-Hing, Sunnyvale, CA (US); Nuri Kim, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/636,407

(22) Filed: Mar. 3, 2015

(65) Prior Publication Data

US 2016/0260326 A1 Sep. 8, 2016

(51) Int. Cl.
G08G 1/09 (2006.01)
G02B 27/01 (2006.01)
G08G 1/16 (2006.01)

(52) U.S. Cl.
CPC ............. *G02B 27/01* (2013.01); *G08G 1/163* (2013.01); *G08G 1/166* (2013.01); *G08G 1/167* (2013.01); *B60R 2300/205* (2013.01); *B60R 2300/305* (2013.01)

(58) Field of Classification Search
CPC ................................ G08G 1/0967; B60R 1/00
USPC .................. 340/905, 909, 915, 925
See application file for complete search history.

(56) References Cited

U.S. PATENT DOCUMENTS

| | | | |
|---|---|---|---|
| 6,580,973 B2 | 6/2003 | Leivian et al. | |
| 7,379,813 B2 | 5/2008 | Kubota et al. | |
| 7,680,592 B2 | 3/2010 | Ikeda | |
| 7,815,313 B2 | 10/2010 | Ito et al. | |
| 2010/0045797 A1* | 2/2010 | Schofield | G06K 9/00818 348/148 |
| 2011/0199197 A1 | 8/2011 | Takatsudo et al. | |
| 2012/0224060 A1 | 9/2012 | Gurevich et al. | |
| 2012/0310531 A1* | 12/2012 | Agarwal | H04W 72/1252 701/439 |
| 2012/0320207 A1 | 12/2012 | Toyofuku | |
| 2013/0120850 A1 | 5/2013 | Lambert et al. | |
| 2013/0215270 A1* | 8/2013 | Murashita | B60R 1/00 348/148 |
| 2013/0253816 A1 | 9/2013 | Caminiti et al. | |
| 2014/0214276 A1* | 7/2014 | Yamamoto | B60R 1/00 701/41 |
| 2014/0226015 A1 | 8/2014 | Takatsudo et al. | |
| 2014/0314275 A1 | 10/2014 | Edmondson et al. | |

* cited by examiner

*Primary Examiner* — Qutbuddin Ghulamali
(74) *Attorney, Agent, or Firm* — Honda Patents & Technologies North America, LLC; Aaron C. Fong

(57) ABSTRACT

A vehicle having a sensor and a head-up display is provided. The sensor can detect pedestrians at an intersection. The head-up display can depict an augmented reality indicator represented as the intersection and the pedestrians. The augmented reality indicator can be displayed directly in a driver's field of view centralized to provide a situational environment for the driver. The head-up display can show pedestrians outside the driver's field of view.

20 Claims, 6 Drawing Sheets

PEDESTRIAN INTERSECTION ALERT SYSTEM AND METHOD THEREOF

BACKGROUND

Automobile manufacturers have recently begun to include head-up displays in their car designs in an attempt to reduce driver distractions. These systems can be designed to focus a driver's attention in front of them instead of other areas within the vehicle. These head-up displays can include speed gauges such that a driver can monitor their current speed without looking into the dashboard. Further, head-up displays can include simple two-dimensional navigation instructions removing the need to look at a center console within the vehicle.

While information provided on a head-up display is useful, current content on the display has been limited. For example, content has been limited to two-dimensional images referencing only vehicle and navigational information. Situational awareness of a driver's environment has not been fully captured by content within head-up displays. For example, a driver's understanding of pedestrians at an intersection setting has not been realized. As a result, a pedestrian intersection alert system and method thereof is needed.

BRIEF DESCRIPTION

According to one aspect of the present disclosure, a method for displaying a situational environment of a vehicle at an intersection is provided. The method can include upon approaching the intersection, identifying pedestrians at the intersection. In addition, the method can include displaying an indicator representing the intersection and pedestrians.

According to another aspect of the present disclosure, a pedestrian intersection alert system is provided. The system can include a head-up display, at least one processor, and a memory operatively coupled to the processor, the memory storing program instructions that when executed by the processor, causes the processor to perform processes. The processes can include identifying pedestrians at an intersection and displaying a bird's eye view of the intersection and the pedestrians on the head-up display.

According to yet another aspect of the present disclosure, a vehicle is provided. The vehicle can include a sensor detecting pedestrians at an intersection and a head-up display depicting an augmented reality indicator for the intersection and the pedestrians.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
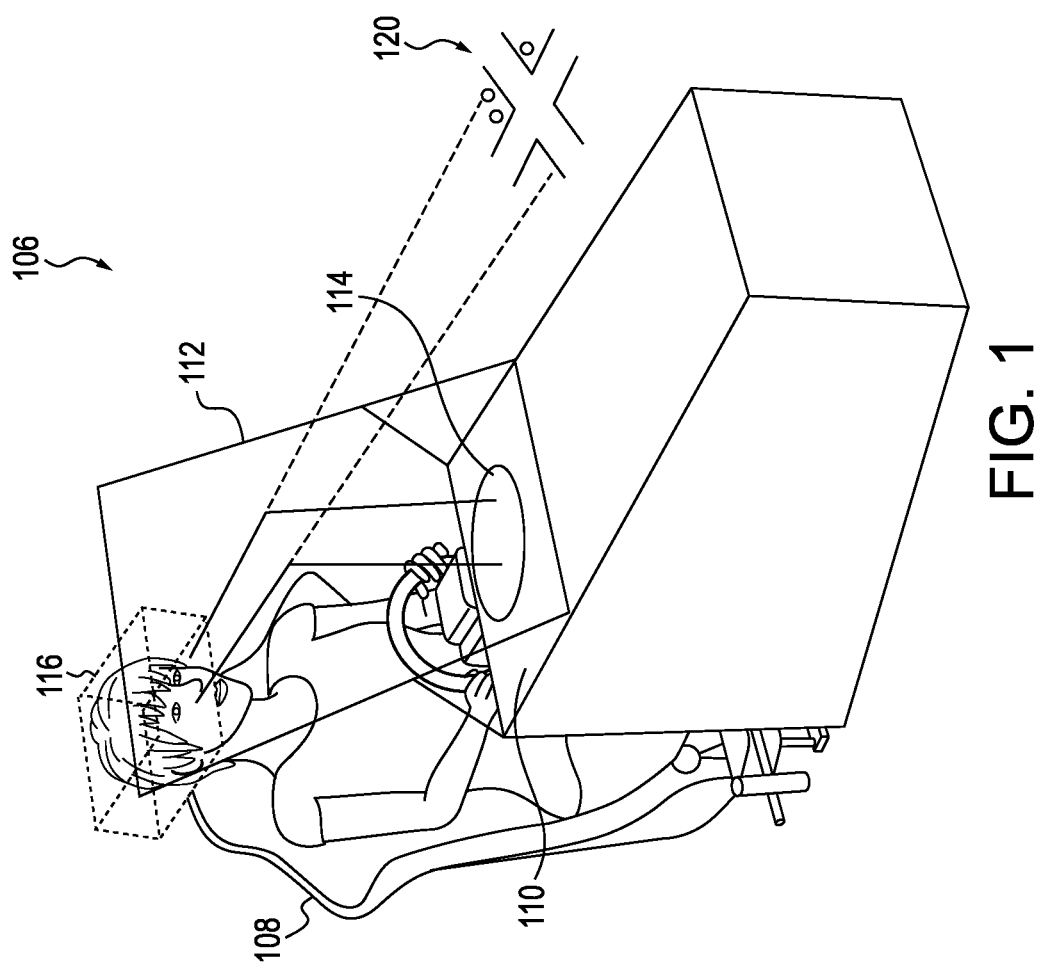
FIG. 1 is an illustrative block diagram depicting an exemplary head-up display for showing an augmented reality indicator for a pedestrian intersection alert system in accordance with one aspect of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

A "processor," as used herein, includes, but is not limited to a device that can process signals and perform general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory," as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device. Memory can be operatively coupled to the processor. The memory can store program instructions that can be executed by the processor.

A "disk," as used herein, can be a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "operable connection" or a connection by which entities are "operably connected," as used herein, is one in which signals, physical communications, and/or logical communications can be sent and/or received. An operable connection can include a wireless interface, a physical interface, a data interface, and/or an electrical interface.

Generally described, the systems and methods provided herein are directed to content provided on a vehicle head-up display. The content, according to one exemplary embodiment, can be an augmented reality indicator for a pedestrian intersection alert system. The head-up display can depict the augmented reality indicator as a bird's eye view of an intersection that the vehicle is approaching. The indicator can be placed directly in front of the driver at a centralized location or position removing the need for focusing outside of a predetermined area. Through at least one sensor, pedestrians can be detected at the intersection. Detected pedestrians can be placed as dots within the augmented reality indicator showing locations of the pedestrians within the intersection. When pedestrians cross the street, a cross walk visual can appear.

A number of advantages can be provided using the systems and methods described herein. Driver distraction can be reduced through the head-up display as it focuses the driver's attention directly in front of them within their field of view. The augmented reality indicator provides a method of visualizing the location of pedestrians at an intersection without having to look outside that field of view. Pedestrians can be indicated by dots or other indicia such that the driver can analyze the entire intersection at once to understand the situational environment. Other advantages will become apparent from the description provided below.

Figure 2:
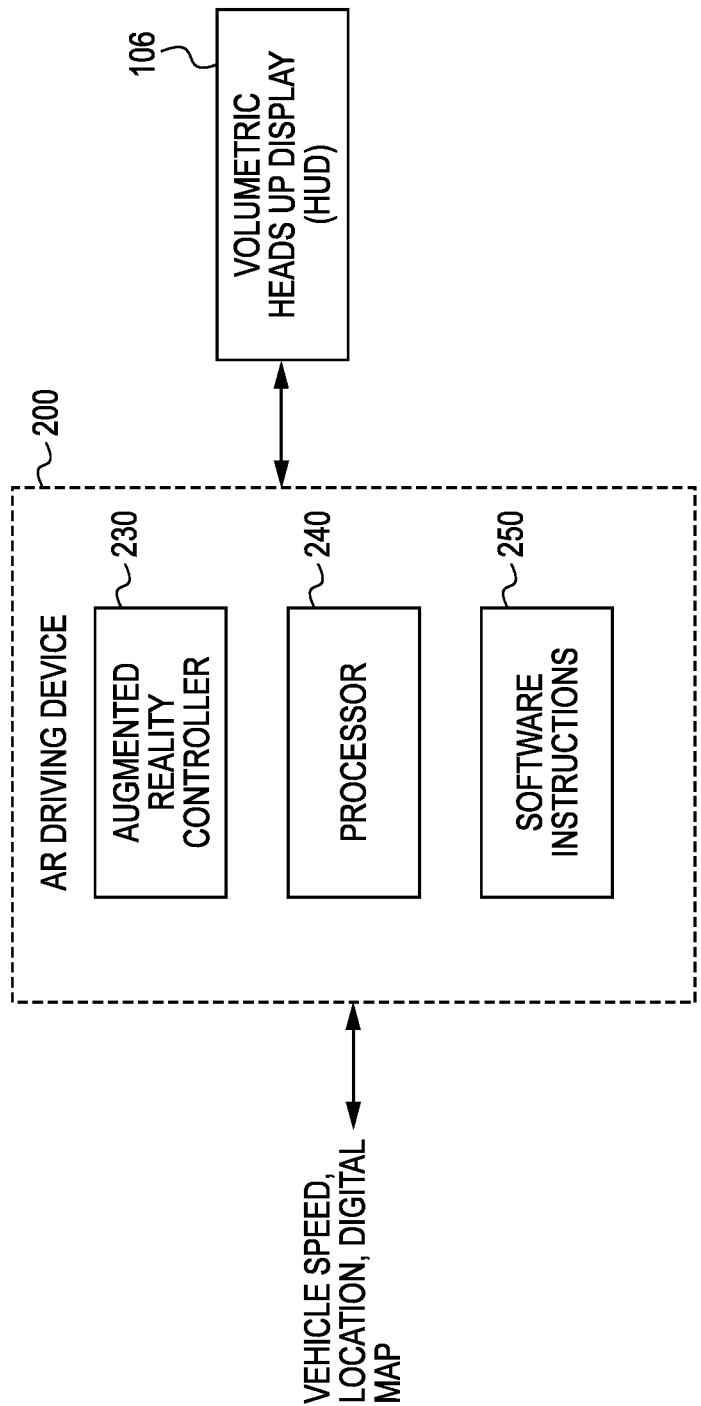
FIG. 2 illustrates a block diagram of an exemplary augmented reality driving device for providing the pedestrian intersection alert system in accordance with one aspect of the present disclosure.
Figure 3:
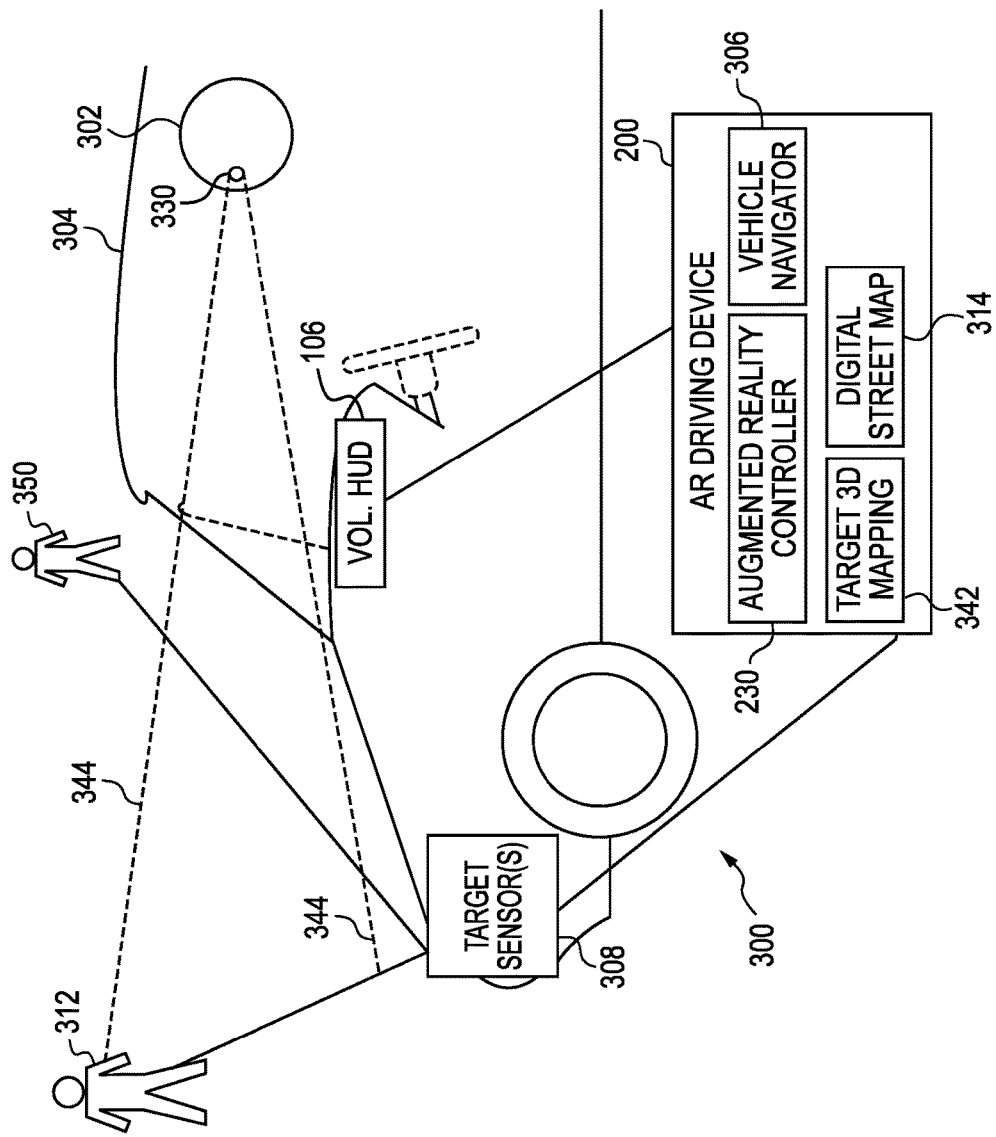
FIG. 3 illustrates an exemplary cross section of a vehicle and a block diagram of the augmented reality driving device in accordance with one aspect of the present disclosure.
Figure 4:
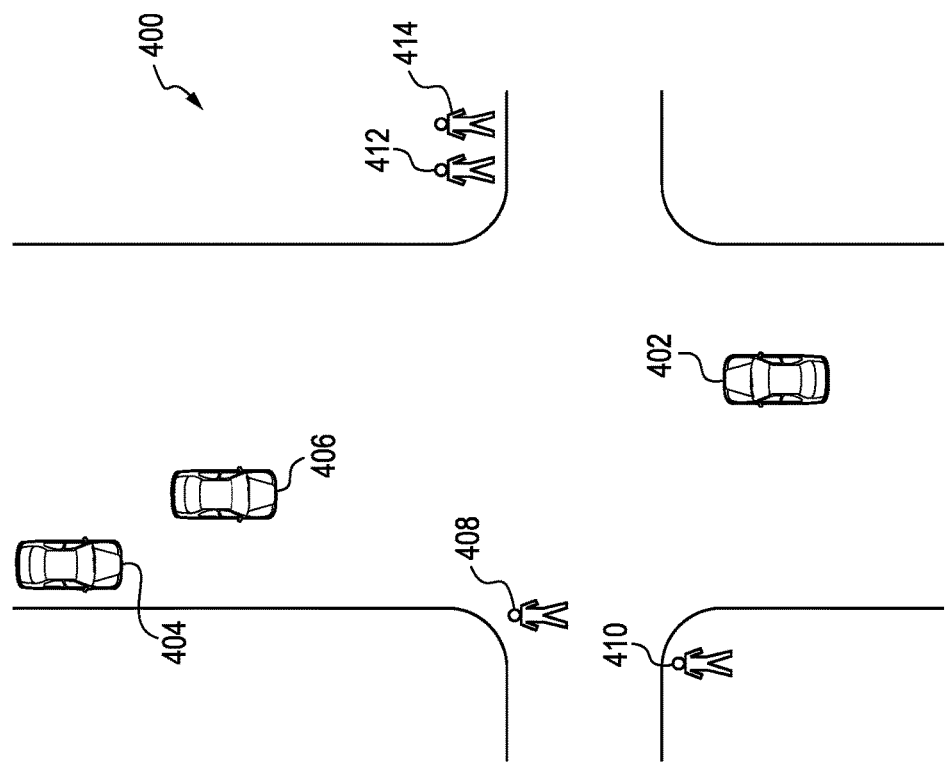
FIG. 4 illustrates a top view of a road with an exemplary intersection where pedestrians are located in accordance with one aspect of the present disclosure.
Figure 5:
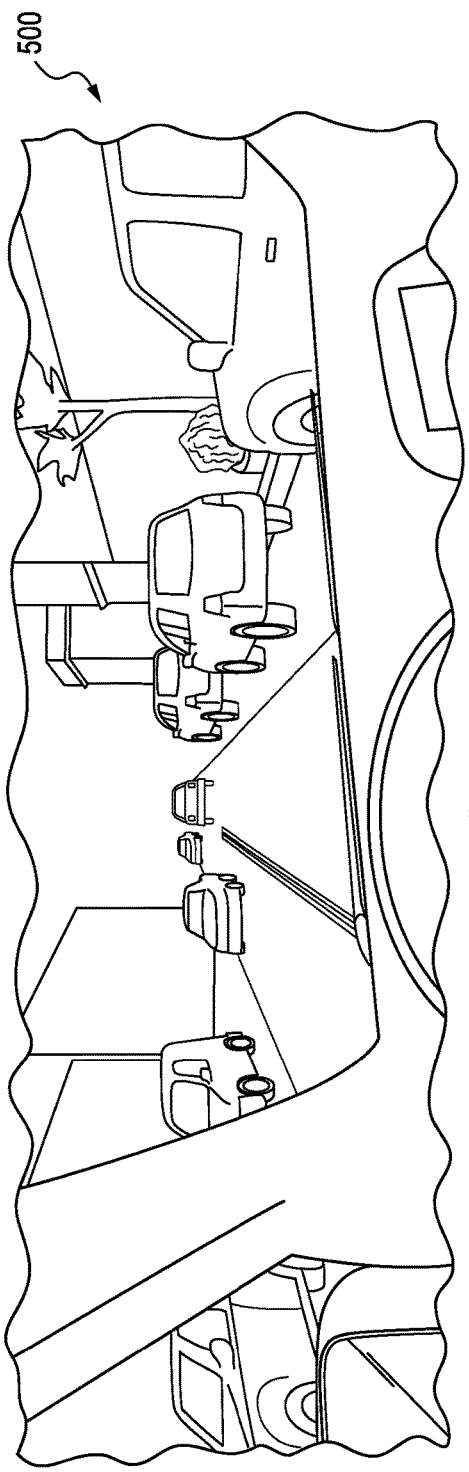
FIG. 5 illustrates an exemplary point of view as a driver approaches an intersection in accordance with one aspect of the present disclosure.
Figure 6:
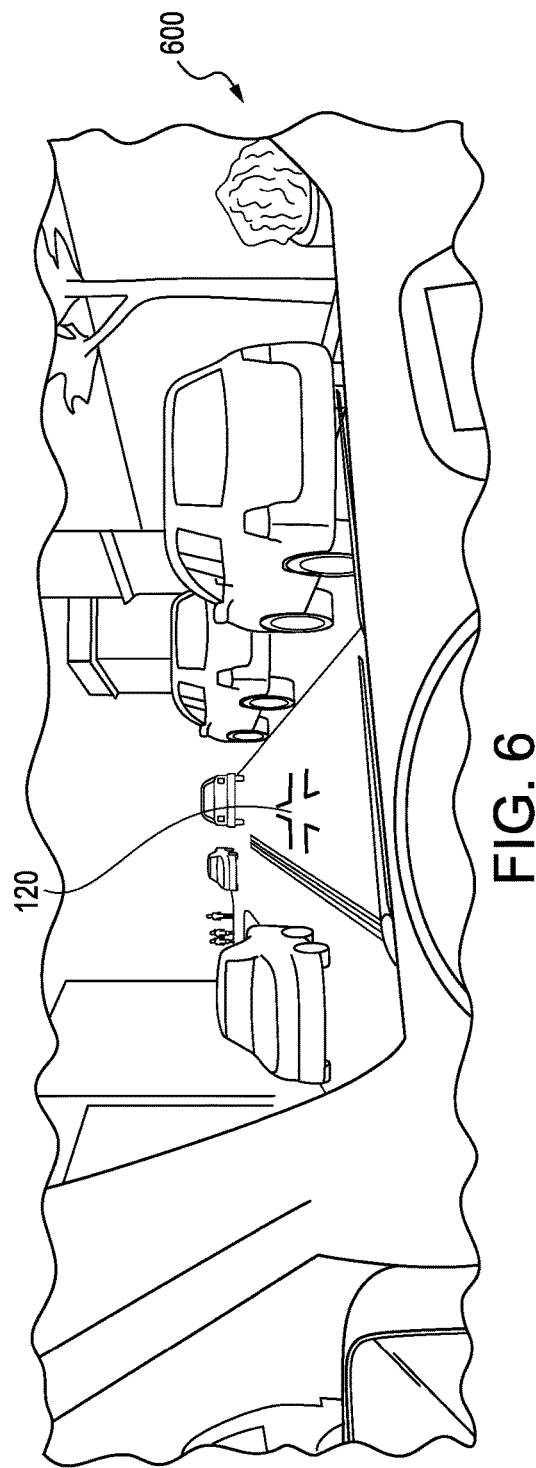
FIG. 6 illustrates an exemplary point of view as the driver approaches the intersection and the augmented reality indicator is provided in accordance with one aspect of the present disclosure.
Figure 7:
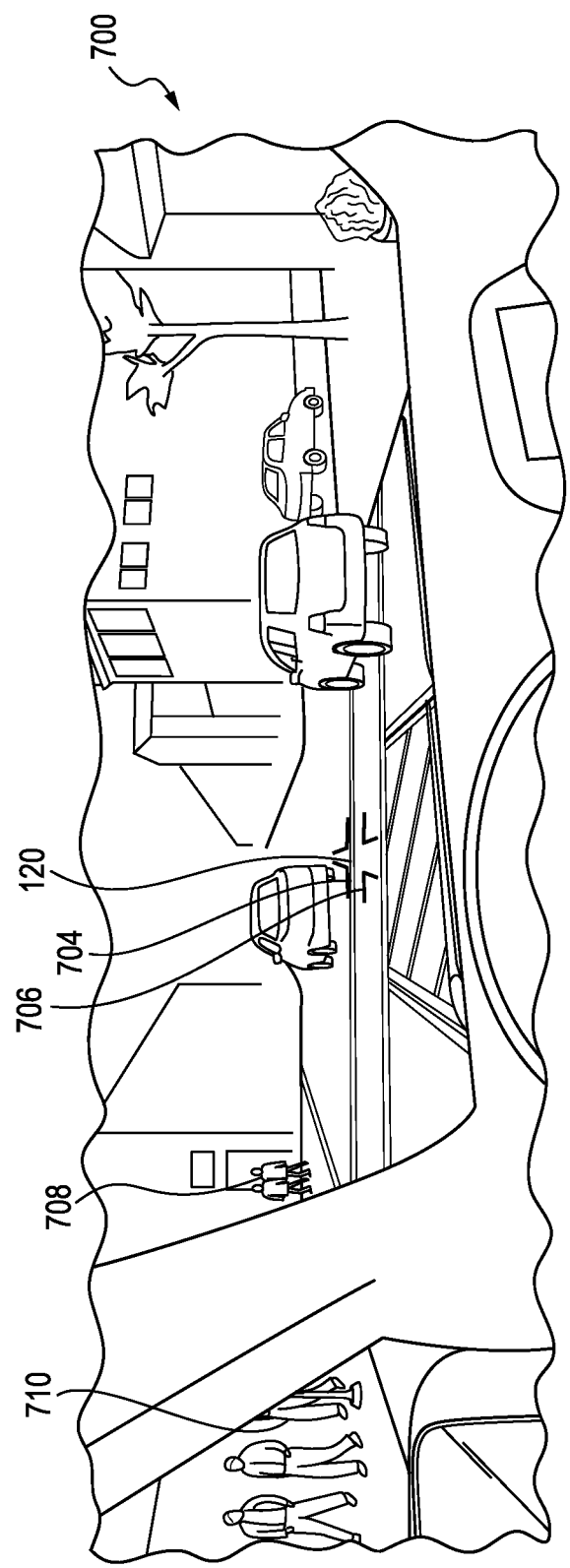
FIG. 7 illustrates an exemplary point of view as the driver is at the intersection and the augmented reality indicator is populated with pedestrian indicia in accordance with one aspect of the present disclosure.

While the augmented reality indicator is shown as being a representative intersection with dot indicia for pedestrians, other types of notifications can be used and are not limited to those described herein. For example, the intersection can be represented as a flat two dimensional image instead of being projected from a bird's eye view. Furthermore, pedestrians can be represented as avatars depicting actual heights of the pedestrians. Additional embodiments will be described below. With reference to the FIGURES, FIGS. 1 through 3 depict exemplary hardware for providing the pedestrian intersection alert system. FIG. 4 shows a typical intersection where pedestrians are detected while FIGS. 5 through 7 provide exemplary points of view using the pedestrian intersection alert system.

FIG. 1 is an illustrative block diagram depicting an exemplary head-up display 106 for showing an augmented reality indicator 120 for a pedestrian intersection alert system in accordance with one aspect of the present disclosure is provided. The pedestrian intersection alert system can be used with a volumetric head-up display 106. Alternatively, the indicator 120 representing the intersection and the pedestrians can be depicted on an instrument cluster or other location within the vehicle.

The vehicular volumetric head-up display 106 can be capable of rendering volumetric contact-analog augmented reality graphic elements (e.g., 3-dimensional or "3-D" graphic elements rendered into the same space as the real environment) with correctly reproduced depth cues. The configuration of the vehicle, with respect to the relative positioning of the driver seat 108, dashboard enclosure 110, and windshield 112, for example, can be conventional. The dashboard enclosure 110 can have a head-up display exit aperture 114 defined through an upper surface thereof. The head-up display 106 housed in the dashboard enclosure 110 can project graphic elements, such as contact-analog augmented reality graphic elements, through the head-up display exit aperture 114 to the windshield 112.

The eye box 116 can be sized to encompass different possible head positions of the driver regardless of a position and posture of the driver seat 108, or the head-up display 106 can be configured to detect the position and posture of the driver seat 108, and to adjust a position and size of the eye box 116 based thereon. Through the head-up display 106, the augmented reality indicator 120 for the pedestrian intersection alert system can be shown.

Referring to FIG. 2, a block diagram of an exemplary augmented reality driving device 200 for providing the pedestrian intersection alert system in accordance with one aspect of the present disclosure is provided. The device 200 can be in communication with the volumetric head-up display 106. The device 200 can include an augmented reality controller 230 which has a processor 240 to execute software instructions 250 to perform operations, in part, of:

Determining whether a user is approaching an intersection;

Upon approaching the intersection, detecting pedestrians at the intersection;

Three dimensionally mapping an augmented reality indicator of the intersection on the volumetric head-up display; and Spatially overlaying indicia for the detected pedestrians on the intersection projected by the volumetric head-up display.

The augmented reality controller 230 can further perform operations of accessing one or more of a digital map, a location of the vehicle, and/or a current speed of the vehicle. For example, receiving the user speed of the vehicle can determine when to display the augmented reality indicator of the intersection and detected pedestrians. In addition, the digital map can be used to obtain an accurate representation of the intersection that the vehicle is approaching.

FIG. 3 illustrates an exemplary cross section of a vehicle 304 and a block diagram of the augmented reality driving device 200 in accordance with one aspect of the present disclosure. Processes can be performed by the augmented reality controller 230. A vehicle navigator 306 of the augmented reality driving device 200 can detect when a driver is approaching an intersection based upon location and speed for the vehicle 304. Current position and proximity can be determined, for example, by accessing a digital street map 314 used by the vehicle navigator 306.

The target sensor(s) 308 can detect the presence or absence of, and a location of pedestrians 312 and 350. While shown on the vehicle 304, the sensor(s) 308 are not necessarily confined to the vehicle 304. For example, the sensor(s) 308 can be tied to the intersection and information about pedestrians can be relayed though near field communications or other wireless systems to the vehicle 304. Target sensor(s) 308 can include, but are not limited to, cameras, LIDAR, photoelectric sensors, or radar. Other types of sensor(s) 308, or a combination of sensor(s) 308, can be used. In one embodiment, the sensor(s) can be used to determine a pedestrian's intentions and whether they intend to go into the crosswalk with such determinations being relevant for display on the indicator 120.

The pedestrian intersection alert system 300 can be used to identify pedestrians 312 and 350 within and outside the field of view 344 of the driver 302. While only two pedestrians 312 and 350 are shown, fewer or more pedestrians can be detected and is not limited to any number. From the field of view 344, and in some instances, pedestrians are not detected by the driver 302 especially if there are a number of blind spots. For example, a pedestrian 312 within the field of view 344 can be easily detected within the vantage point 330 of the driver 302, however, another pedestrian 350 outside the field of view 344 is not. Through the target sensor(s) 308, both pedestrians can be detected 312 and 350 without them being in the field of view 344. By allowing the target sensor(s) 308 to identify pedestrians 312 and 350, the driver 302 can fully understand their situational environment. Multiple sensors 308 can be used and positioned throughout the vehicle 304.

The augmented reality controller 230 can have a target 3D mapping component 342 to three dimensionally map the augmented reality indicator 120 showing the intersection with spatially overlaid pedestrians through the volumetric head-up display 106. The volumetric head-up display 106 can be capable of projecting multiple focal planes including a ground plane with respect to a vantage point 330 of the driver 302.

FIG. 4 illustrates a top view of a road with an exemplary intersection 400 where pedestrians 408, 410, 412, and 414 are located in accordance with one aspect of the present disclosure. Fewer or more pedestrians can be provided at the intersection 400 and are not limited to those shown. In one embodiment, pedestrians, while not shown, can also be riding bicycles, on wheelchairs, or located on other types of transportation mechanisms, typically all of which can be detected by the target sensor(s) 308 on the vehicle 304. Pedestrians can also be partially occluded yet still be detected by the sensor(s) 308. Different statures of pedestrians can also be detected by the sensor(s) 308, for example, the differences between a child and adult.

As shown, pedestrians 408, 410, 412, and 414 have been detected by the target sensor(s) 308. In one embodiment, the detected pedestrians 408, 410, 412, and 414 can be within a predetermined distance from the crosswalks at the intersection 400, or alternatively, from the road of the intersection 400. Pedestrians can be detected if they are within a predetermined distance from the crosswalks or roadways, for example five feet. The sensor(s) 308 could detect outliers but leave them out of the projected augmented reality indicator 120. The sensor(s) 308 can identify pedestrians crossing the intersection as well.

Pedestrian detections can be based on the detected speed of the pedestrian, for example, the faster a pedestrian moves, the more likely they would be included within the augmented reality indicator 120. In one embodiment, when a pedestrian 408 is crossing a crosswalk or roadway, indicia can be placed by them providing a heightened sense of alertness. Cross walk visuals can also appear in the indicator 120, for example, the pedestrians can be depicted as moving through indicia.

As will be discussed in more details below, the augmented reality indicator 120 can be placed in a driver's field of view 344 at a centralized location or position to provide a situational environment for the driver 302. The location of the indicator 120 on the volumetric head-up display 106 can be shown in a semi-transparent form such that other vehicles 404 and 406 can also be seen and not distort the driver's reality. Without the need to glance in different directions to determine if a pedestrian is at an intersection 400, the indicator 120 on the driver's vehicle 402 can provide relevant information.

Now turning to FIGS. 5 through 7, a typically scenario for providing the augmented reality indicator 120 displaying the intersection 140 and the pedestrians will be shown. FIG. 5 illustrates an exemplary point of view 500 as the driver 302 approaches an intersection 400 in accordance with one aspect of the present disclosure. Before the driver 302 approaches the intersection 400, the augmented reality indicator 120 is typically not displayed. The vehicle 304 can determine its location through the digital street map 314 and the vehicle navigator 306 and whether it is approaching the intersection 400.

As the vehicle 304 approaches the intersection 400, the augmented reality indicator 120 showing the intersection 400 appears. The indicator 102 can appear as a three dimensional mapping of an augmented reality indicator of the intersection on the volumetric head-up display 106. FIG. 6 illustrates an exemplary point of view 600 as the driver 302 approaches the intersection 400 and an augmented reality indicator 120 is provided in accordance with one aspect of the present disclosure. The indicator 120 can be provided at a bird's eye view. The indicator 120 can appear before a predetermined distance in front of the intersection 400, for example, ten feet. In one embodiment, the target sensor(s) 308 can be activated before the indicator 120 is shown or when it appears on the volumetric head-up display 106.

As pedestrians are detected by the target sensor(s) 308, the intersection 400 as displayed by the augmented reality indicator 120 becomes populated with indicia represented as dots. FIG. 7 illustrates an exemplary point of view 700 as the driver 302 is at the intersection 400 and the augmented reality indicator 120 is populated with pedestrian indicia 704 and 706 in accordance with one aspect of the present disclosure.

The target 3D mapping 342 can spatially overlay indicia 704 and 706 for the corresponding detected pedestrians 708 and 710 on the augmented reality indicator 120 projected by the volumetric head-up display 106 in the form of corresponding dots. In one embodiment, when a large number of pedestrians are detected, the dots 704 and 706 can be grouped together to form larger indicia. While represented as dots 704 and 706, other indicia can be used including avatars or a three-dimensional form. Once the vehicle 304 passes the intersection 400, the indicator 120 can be removed.

As shown, the augmented reality indicator 120 can take a potentially complex scenario and simplify it for the driver 302 to still assess the situation and avoid accidents with pedestrians. The location of multiple pedestrians can be provided along with the awareness of pedestrians crossing the street which can help the driver decide if it is safe to turn. The augmented reality indicator 120 can keep the driver's focus the road by utilizing the head-up display 106.

In one embodiment, the augmented reality indicator 120 can be intended to help the driver 302 know when it is safe to proceed through the intersection 400 or notice pedestrians that can be in their blind spot or outside of their main field of view 344. Using pedestrian detection algorithms, the pedestrian locations can be communicated to the driver 302 through this visual in the volumetric head-up display 106. The volumetric head-up display 106 can provide a perspective view that can be more intuitive for drivers to interpret. These visuals can also be shown in a secondary display or the instrument cluster if no head-up display 106 is present. This pedestrian intersection alert system 300 can focus specifically on intersection situations, which can be much more complex because of the number of pedestrians.

While the intersection 400 above is shown as a typical four-way intersection, the pedestrian intersection alert system 300 can be used for many different types of intersections and are not limited to those described above. In one embodiment, the pedestrian intersection alert system 300 can be utilized outside the intersection context. For example, the system 300 can be turned on continuously even straight roads such that it can identify pedestrians without any crosswalk. This can alert a driver of a jaywalkers or valid crosswalks without intersections.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for displaying a situational environment of a vehicle on a head-up display, the method comprising:
   determining that the vehicle is approaching an intersection;
   generating an intersection indicator representing a perspective view of the intersection;
   displaying the intersection indicator on the head-up display upon determining that the vehicle is approaching the intersection;

identifying a location of at least one pedestrian at the intersection through at least one sensor; and overlaying at least one pedestrian indicia on the intersection indicator based on the identified location of the at least one pedestrian.

2. The computer-implemented method of claim 1, wherein identifying the location of the at least one pedestrian at the intersection comprises activating the at least one sensor.

3. The computer-implemented method of claim 1, wherein identifying the location of the at least one pedestrian at the intersection comprises locating pedestrians that are within a predetermined distance from a crosswalk.

4. The computer-implemented method of claim 1, wherein displaying the intersection indicator comprises presenting the intersection indicator at a centralized location on the head-up display of the vehicle.

5. The computer-implemented method of claim 1, wherein displaying the intersection indicator comprises displaying a bird's eye view of the intersection.

6. The computer-implemented method of claim 1, wherein overlaying the at least one pedestrian indicia on the intersection indicator comprises depicting the at least one pedestrian indicia as a dot on the intersection indicator.

7. The computer-implemented method of claim 1, comprising depicting the at least one pedestrian indicia as moving.

8. The computer-implemented method of claim 1, wherein overlaying the at least one pedestrian indicia on the intersection indicator comprises depicting at least one pedestrian outside a field of view.

9. The computer-implemented method of claim 1, wherein displaying the intersection indicator representing the intersection and overlaying the at least one pedestrian indicia on the intersection indicator comprises depicting the intersection indicator and the at least one pedestrian indicia on an augmented reality head-up display.

10. The computer-implemented method of claim 1, comprising removing the intersection indicator and the at least one pedestrian indicia when the vehicle passes the intersection.

11. The computer-implemented method of claim 1, wherein displaying the intersection indicator on the head-up display comprises:

generating a mapping corresponding to the intersection; and displaying the mapping as the intersection indicator such that the intersection indicator accurately represents the intersection.

12. A pedestrian intersection alert system for a vehicle comprising:

a head-up display;

at least one processor; and a memory operatively coupled to the processor, the memory storing program instructions that when executed by the processor, causes the processor to:

determine that the vehicle is approaching an intersection;

generate and display an intersection indicator represented as a bird's eye view of the intersection on the head-up display;

identify a location of at least one pedestrian at the intersection; and spatially overlay at least one pedestrian indicia on the intersection indicator based on the identified location of the at least one pedestrian displayed on the head-up display.

13. The pedestrian intersection alert system of claim 12, wherein the memory storing program instructions, when executed by the processor, causes the processor to activate a camera on the vehicle for identifying the location of the at least one pedestrian at the intersection.

14. The pedestrian intersection alert system of claim 12, wherein spatially overlaying the at least one pedestrian indicia on the intersection indicator comprises depicting the at least one pedestrian indicia as a dot on the intersection indicator.

15. The pedestrian intersection alert system of claim 12, wherein displaying the intersection indicator represented as the bird's eye view of the intersection on the head-up display comprises depicting the intersection indicator at a centralized position on the head-up display in front of a driver.

16. The pedestrian intersection alert system of claim 12, wherein the memory storing program instructions, when executed by the processor, causes the processor to identify pedestrians crossing the intersection.

17. A vehicle comprising:

a sensor detecting a location of at least one pedestrian at an intersection; and a head-up display depicting a generated augmented reality intersection indicator representing the intersection and spatially overlaying at least one pedestrian indicia on the augmented reality intersection indicator based on the detected location of the at least one pedestrian.

18. The vehicle of claim 17, wherein the augmented reality intersection indicator for the intersection is displayed as the vehicle approaches the intersection.

19. The vehicle of claim 17, wherein the augmented reality intersection indicator is displayed directly in a driver's field of view.

20. The vehicle of claim 17, wherein the detected location of the at least one pedestrian is outside a driver's field of view.

* * * * *